L. EVANS.
Tea and Coffee-Pot.
No. 160,408. Patented March 2, 1875.
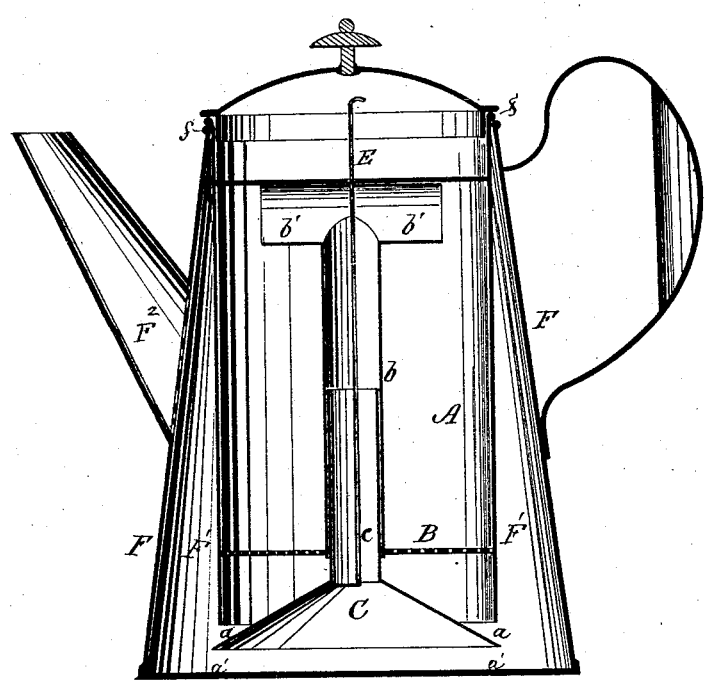
WITNESSES:
INVENTOR:
ATTORNEYS.

UNITED STATES PATENT OFFICE.

LOUIS EVANS, OF PITTSBURG, PENNSYLVANIA.

IMPROVEMENT IN TEA AND COFFEE POTS.

Specification forming part of Letters Patent No. 160,408, dated March 2, 1875; application filed December 12, 1874.

*To all whom it may concern:*

Be it known that I, LOUIS EVANS, of Pittsburg, in the county of Allegheny and State of Pennsylvania, have invented a new and Improved Tea and Coffee Pot; and I do hereby declare that the following is a full, clear, and exact description of the same, reference being had to the accompanying drawing forming a part of this specification, in which the drawing is a sectional elevation.

The invention will first be fully described, in connection with all that is necessary to a full understanding thereof, and then pointed out in the claim.

A is a cylinder or cup, having its body at right angles to its perforated bottom B, (on which is supported the tea or coffee,) and a top flange, $f$, that enables the latter to be suspended in and from the upper edge of pot F. The latter is made large at the bottom and tapering toward the top, being also much higher or deeper than the cup A, so that the lower edge of the cup will be some distance above the bottom of pot and open into a surrounding space, $F^1$, connected with discharge-spout $F^2$. C is an independent cone, with its lower edge $a$ above the pot-bottom $a'$, and is provided with a tube, $c$, that slides in a tube, $b$, that rises up from and opens under the perforated bottom B. E is a rod attached to cone C, passing up through tubes $b\ c$ and out of the cross-tube $b'$. The water under cone C will ascend tubes $b\ c$, and be forced out of tube $b'$ over the coffee or tea as soon as the boiling-point is reached. As it percolates through, the strength of the coffee or tea is extracted and carried therewith out into the space $F^1$. This process is, of course, old, but the means by which it is carried into effect are believed to be new.

The edge of my cone is above the bottom, and enables the boiling process to lift the water and pour it through the tubes $b\ c$ upon the coffee or tea, while it leaves a space between it and the bottom of cup for the ready passage into the space $F^1$ of the liquid extract. It also allows the parts to be separately cleaned, and, in conjunction with the wire E, affords an easy mode of removing the internal portions of the pot.

What I claim as new is—

The separate pieces A C, the latter having a tube, $c$, that slides in a tube, $b$, of the former, in combination with the wire E, arranged as and for the purpose specified.

LOUIS EVANS.

Witnesses:
W. H. H. ALGEO,
J. B. STEVENSON,
JOSEPH A. BUTLER.